(12) United States Patent
Nanda

(10) Patent No.: US 7,356,341 B2
(45) Date of Patent: Apr. 8, 2008

(54) SCHEDULING COMMUNICATIONS IN A WIRELESS NETWORK

(75) Inventor: Sanjiv Nanda, Ramona, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 845 days.

(21) Appl. No.: 10/729,337

(22) Filed: Dec. 4, 2003

(65) Prior Publication Data

US 2005/0124370 A1 Jun. 9, 2005

(51) Int. Cl.
*H04Q 7/20* (2006.01)

(52) U.S. Cl. .............. 455/452.1; 455/41.2; 455/3.04; 455/509

(58) Field of Classification Search ........... 455/102, 455/69, 41.2, 41.3, 3.04, 449, 452.1, 452.2, 455/453, 42, 502, 500, 63.2, 67.11, 90.2, 455/115.1, 115.3, 126, 226.1, 226.2, 226.3, 455/513, 509, 41.1, 414.1; 370/229, 235, 370/347, 338, 332; 375/298, 295, 216

See application file for complete search history.

(56) References Cited

U.S. PATENT DOCUMENTS

2002/0136196 A1 * 9/2002 Moon et al. ............ 370/347
2003/0081692 A1 * 5/2003 Kwan et al. ............ 375/295
2003/0123425 A1   7/2003 Walton et al. .......... 370/341
2003/0125066 A1 * 7/2003 Habetha ................. 455/522
2003/0161268 A1 * 8/2003 Larsson et al. ......... 370/229
2003/0231706 A1 * 12/2003 Hwang .................. 375/219
2003/0236103 A1  12/2003 Tamaki et al. ......... 455/552.1

FOREIGN PATENT DOCUMENTS

EP    1 098 542 A2    5/2001
WO   WO 03/077452 A1   9/2003

OTHER PUBLICATIONS

ElBatt et al, "Joint Scheduling and Power Control for Wireless Ad-hoc Networks", Jun. 23, 2002, pp. 976-984.

* cited by examiner

*Primary Examiner*—Edward F. Urban
*Assistant Examiner*—John J. Lee
(74) *Attorney, Agent, or Firm*—Donald C. Kordich; Thomas R. Rouse (57) ABSTRACT

Systems and techniques are disclosed relating to wireless communications. The systems and techniques involve wireless communications wherein a module or communications device is configured to select a plurality of terminal pairs each having a transmitting terminal and a corresponding receiving terminal, determine a target quality parameter for each of the receiving terminals, and schedule simultaneous signal transmissions from each of the transmitting terminals to its corresponding receiving terminal, the scheduling of the simultaneous transmissions including selecting a power level for each of the signal transmissions that satisfies the target quality parameter for each of the receiving terminals.

28 Claims, 7 Drawing Sheets

SCHEDULING COMMUNICATIONS IN A WIRELESS NETWORK

BACKGROUND

1. Field

The present disclosure relates generally to wireless communications, and more specifically, to various systems and techniques to schedule communications in ad-hoc networks.

2. Background

In conventional wireless communications, an access network is generally employed to support communications for any number of mobile devices. These access networks are typically implemented with multiple fixed site base stations dispersed throughout a geographic region. The geographic region is generally subdivided into smaller regions known as cells. Each base station may be configured to serve all mobile devices in its respective cell. As a result, the access network may not be easily reconfigured to account for varying traffic demands across different cellular regions.

In contrast to the conventional access network, ad-hoc networks are dynamic. An ad-hoc network may be formed when a number of wireless communication devices, often referred to as terminals, decide to join together to form a network. Since terminals in ad-hoc networks operate as both hosts and routers, the network may be easily reconfigured to meet existing traffic demands in a more efficient fashion. Moreover, ad-hoc networks do not require the infrastructure required by conventional access networks, making ad-hoc networks an attractive choice for the future.

Ultra-Wideband (UWB) is an example of a communications technology that may be implemented with ad-hoc networks. UWB provides high speed communications over an extremely wide bandwidth. At the same time, UWB signals are transmitted in very short pulses that consume very little power. The output power of the UWB signal is so low that it looks like noise to other RF technologies, making it less interfering.

Numerous multiple access techniques exist to support simultaneous communications in an ad-hoc network. A Frequency Division Multiple Access (FDMA) scheme, by way of example, is a very common technique. FDMA typically involves allocating distinct portions of the total bandwidth to individual communications between two terminals in the ad-hoc network. While this scheme may be effective for uninterrupted communications, better utilization of the total bandwidth may be achieved when such constant, uninterrupted communication is not required.

Other multiple access schemes include Time Division Multiple Access (TDMA). These TDMA schemes may be particularly effective in allocating limited bandwidth among a number of terminals which do not require uninterrupted communications. TDMA schemes typically dedicate the entire bandwidth to each communication channel between two terminals at designated time intervals.

Code Division Multiple Access (CDMA) techniques may be used in conjunction with TDMA to support multiple communications during each time interval. This may be achieved by transmitting each communication or signal in a designated time interval with a different code that modulates a carrier, and thereby, spreads the spectrum of the signal. The transmitted signals may be separated in the receiver terminal by a demodulator that uses a corresponding code to de-spread the desired signal. The undesired signals, whose codes do not match, are not de-spread in bandwidth and contribute only to noise.

In a TDMA system that uses spread-spectrum communications to support simultaneous transmissions, a robust and efficient scheduling algorithm is desired. The scheduling algorithm may be used to determine the parallel transmissions, as well as the data rate and power level of those transmissions, to prevent excessive mutual interference.

SUMMARY

In one aspect of the present invention, a method of scheduling communications includes selecting a plurality of terminal pairs each having a transmitting terminal and a corresponding receiving terminal, determining a target quality parameter for each of the receiving terminals, and scheduling simultaneous signal transmissions from each of the transmitting terminals to its corresponding receiving terminal, the scheduling of the simultaneous transmissions including selecting a power level for each of the signal transmissions that satisfies the target quality parameter for each of the receiving terminals.

In another aspect of the present invention, a communications terminal includes a scheduler configured to select a plurality of terminal pairs each having a transmitting terminal and a corresponding receiving terminal, determine a target quality parameter for each of the receiving terminals, and schedule simultaneous signal transmissions from each of the transmitting terminals to its corresponding receiving terminal, the scheduling of the simultaneous transmissions including selecting a power level for each of the signal transmissions that satisfies the target quality parameter for each of the receiving terminals.

In yet another aspect of the present invention, a communications terminal includes means for selecting a plurality of terminal pairs each having a transmitting terminal and a corresponding receiving terminal, means for determining a target quality parameter for each of the receiving terminals, and means for scheduling simultaneous signal transmissions from each of the transmitting terminals to its corresponding receiving terminal, the scheduling of the simultaneous transmissions including selecting a power level for each of the signal transmissions that satisfies the target quality parameter for each of the receiving terminals.

In a further aspect of the present invention, computer readable media embodying a program of instructions executable by a computer program may be used to perform a method of scheduling communications, the method including selecting a plurality of terminal pairs each having a transmitting terminal and a corresponding receiving terminal, determining a target quality parameter for each of the receiving terminals, and scheduling simultaneous signal transmissions from each of the transmitting terminals to its corresponding receiving terminal, the scheduling of the simultaneous transmissions including selecting a power level for each of the signal transmissions that satisfies the target quality parameter for each of the receiving terminals.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention. Acronyms and other descriptive terminology may be used merely for convenience and clarity and are not intended to limit the scope of the invention.

In the following detailed description, various aspects of the present invention may be described in the context of a UWB wireless communications system. While these inventive aspects may be well suited for use with this application, those skilled in the art will readily appreciate that these inventive aspects are likewise applicable for use in various other communication environments. Accordingly, any reference to a UWB communications system is intended only to illustrate the inventive aspects, with the understanding that such inventive aspects have a wide range of applications.

Figure 1:
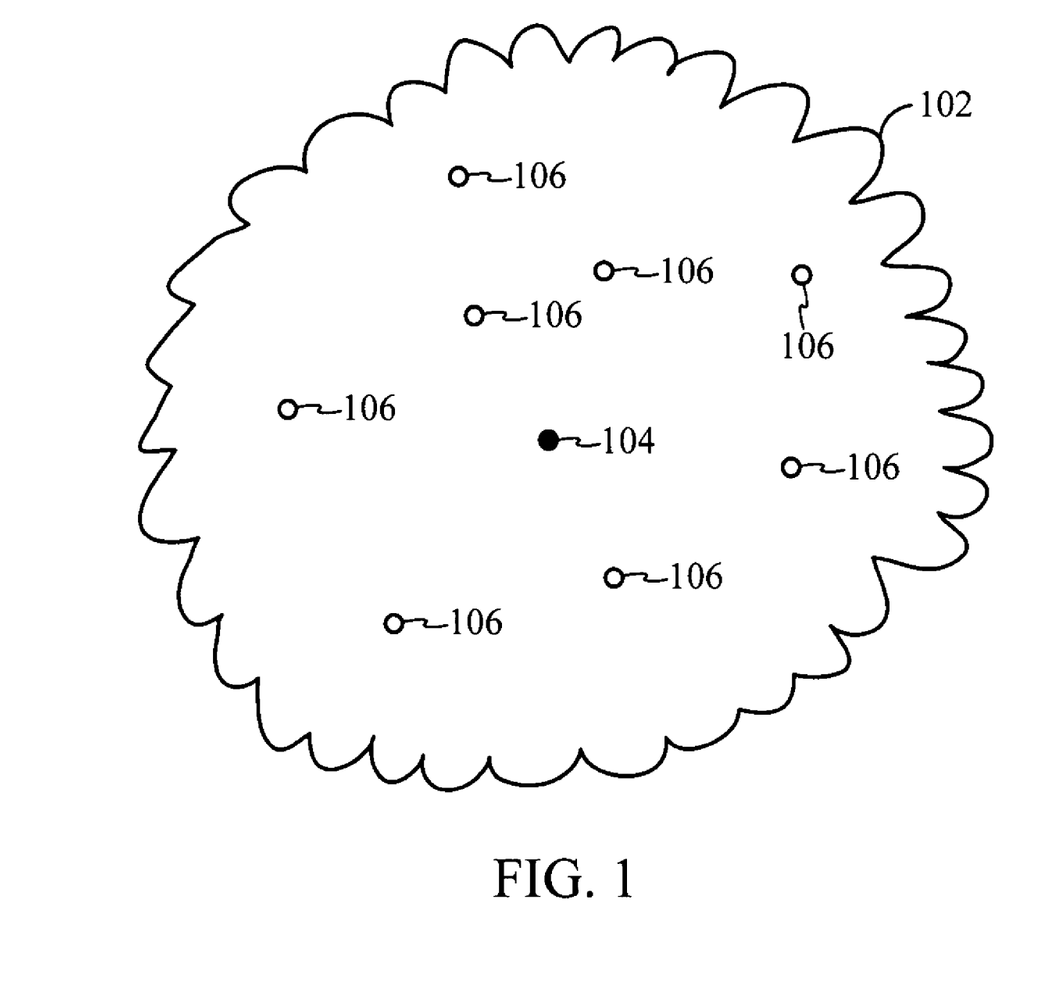
FIG. 1 is a conceptual diagram illustrating an example of a piconet.

FIG. 1 illustrates an example of a network topology for a piconet in a wireless communications system. A "piconet" is a collection of communication devices or terminals connected using wireless technology in an ad-hoc fashion. The terminals may be stationary or in motion, such as a terminal that is being carried by a user on foot or in a vehicle, aircraft or ship. The term "terminal" is intended to encompass any type of communications device including cellular, wireless or landline phones, personal data assistants (PDA), laptops, external or internal modems, PC cards, and any other similar devices.

In at least one embodiment of the wireless communications system, each piconet has one master terminal and any number of member terminals slaved to the master terminal. In FIG. 1, a piconet 102 is shown with a master terminal 104 supporting communications between several member terminals 106. The master terminal 104 may be able to communicate with each of the member terminals 106 in the piconet. The member terminals 106 may also be able to directly communicate with one another under control of the master terminal 104. As to be explained in greater detail below, each member terminal 106 in the piconet 102 may also be able to directly communicate with terminals outside the piconet.

The master terminal 104 may communicate with the member terminals 106 using any multiple access scheme, such as TDMA, FDMA, CDMA, or any other multiple access scheme. To illustrate the various aspects of the present invention, the wireless communications system shown in FIG. 1 will be described in the context of a hybrid multiple access scheme employing both TDMA and CDMA technologies. Those skilled in the art will readily understand that the present invention is in no way limited to such multiple access schemes.

A piconet may be formed in a variety of ways. By way of example, when a terminal initially powers up, it may search for pilot signals from various piconet master terminals. The pilot signal broadcast by each piconet master terminal may be an unmodulated spread-spectrum signal, or any other reference signal. In spread-spectrum configurations, a psuedo-random noise (PN) code unique to each piconet master terminal may be used to spread the pilot signal. Using a correlation process, the terminal may search through all possible PN codes to identify the master terminal with the strongest pilot signal. If the strongest pilot signal is received with sufficient signal strength to support a minimum data rate, then the terminal may attempt to join the piconet by registering with the master terminal.

In some instances, a terminal may be unable to find a pilot signal of sufficient signal strength to support the minimum data rate. This may result from any number of reasons. By way of example, the terminal may be too far from the master terminal. Alternatively, the propagation environment may be insufficient to support the requisite data rate. In either case, the terminal may be unable to join an existing piconet, and therefore, may begin operating as an isolated terminal by transmitting its own pilot signal. The isolated terminal may become the master terminal for a new piconet. Other terminals that are able to receive the pilot signal broadcast from the isolated terminal with sufficient strength may attempt to acquire that pilot signal and join the piconet of this isolated terminal.

The master terminal 104 may use a periodic frame structure to coordinate intra-piconet communications. This frame is often referred to in the art as a Medium Access Control (MAC) frame because it is used to provide access to the communications medium for various terminals. The frame may be any duration depending on the particular application and overall design constraints. For the purpose of discussion, a frame duration of 5 ms will be used. A 5 ms frame is reasonable to accommodate a high chip rate of 650 Mcps and a desire to support data rates down to 19.2 kbps.

Figure 2:
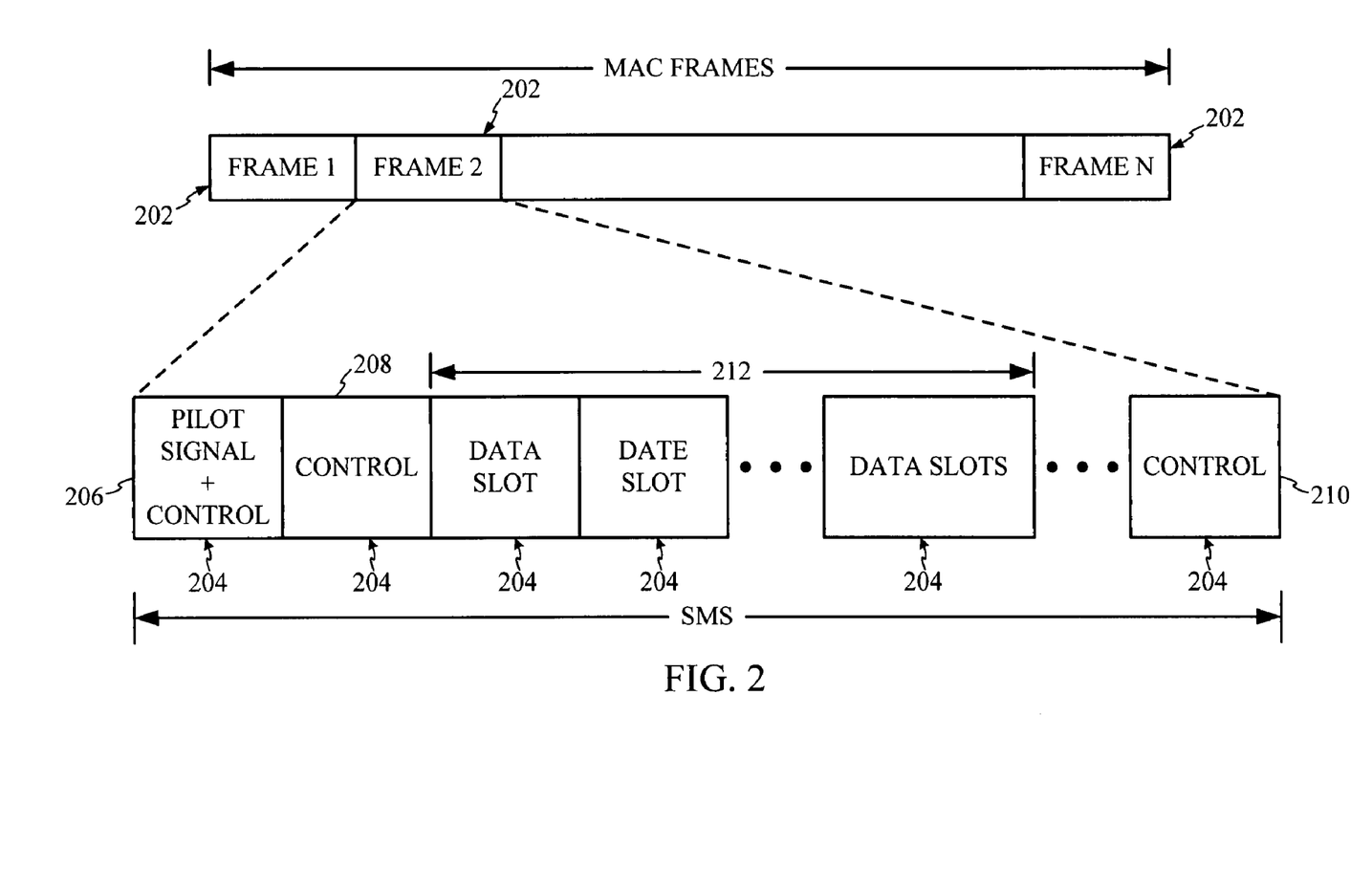
FIG. 2 is a conceptual diagram illustrating an example of a Medium Access Control (MAC) frame for controlling intra-piconet communications.

An example of a MAC frame structure is shown in FIG. 2 with n number of frames 202. Each frame may be divided into 160 or any other number of time slots 204. The slot duration may be 31.25 µs, which corresponds to 20,312.5 chips at 650 Mcps. The frame may dedicate some of its slots for overhead. By way of example, the first slot 206 in the frame 202 may be used to broadcast the spread-spectrum pilot signal to all the member terminals. The pilot signal may occupy the entire slot 206, or alternatively, be time shared with a control channel. The control channel occupying the end of the first slot 206 may be a spread-spectrum signal broadcast to all the member terminals at the same power level as the pilot signal. The master terminal may use this control channel to define the composition of the MAC frame.

The master terminal may be responsible for scheduling intra-piconet communications. This may be accomplished through the use of one or more additional spread-spectrum control channels which occupy various time slots within the frame, such as time slots 208 and 210 in FIG. 2. These additional control channels may be broadcast by the master terminal to all the member terminals and include various scheduling information. The scheduling information may include time slot assignments for communications between terminals within the piconet. As shown in FIG. 2, these time slots may be selected from the data slots portion 212 of the frame 202. Additional information, such as the power level and data rate for each communication between terminals, may also be included. The master terminal may also grant transmit opportunities in any given time slot to any number of terminal pairs using a CDMA scheme. In this case, the scheduling information may also assign the spreading codes to be used for the individual communications between terminals.

The master terminal may periodically set aside a fraction of time for peer-to-peer transmissions. During this time, the master terminal 104 may assign one of the member terminals 106 to communicate with one or more isolated terminals and/or adjacent piconets. These transmissions may require high transmit power, and in some instances, can only be sustained at low data rates. In the event that high power transmissions are needed to communicate with the isolated terminals and/or adjacent piconets, the master terminal may decide not to schedule any intra-piconet communications at the same time.

Figure 3:
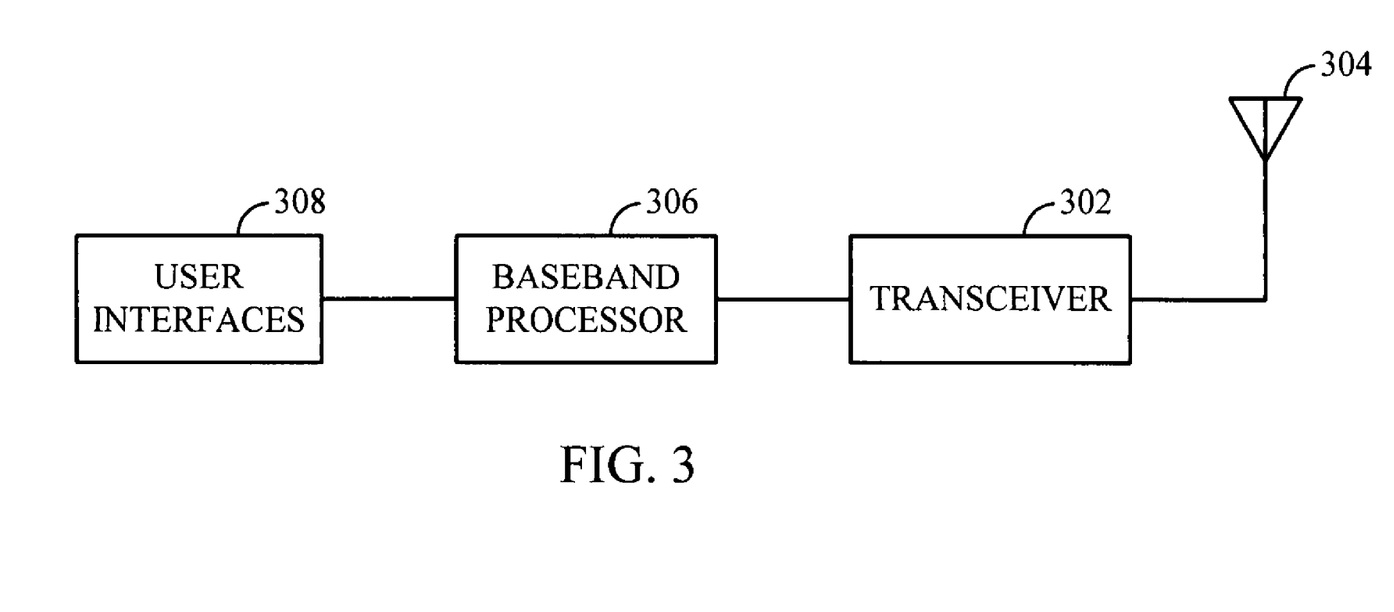
FIG. 3 is a functional block diagram illustrating an example of a terminal capable of operating within a piconet.

FIG. 3 is a conceptual block diagram illustrating one possible configuration of a terminal. As those skilled in the art will appreciate, the precise configuration of the terminal may vary depending on the specific application and the overall design constraints. For the purposes of clarity and completeness, the various inventive concepts will be described in the context of a UWB terminal with spread-spectrum capability, however, such inventive concepts are likewise suitable for use in various other communication devices. Accordingly any reference to a spread-spectrum UWB terminal is intended only to illustrate the various aspects of the invention, with the understanding that such aspects have a wide range of applications.

The terminal may be implemented with a front end transceiver 302 coupled to an antenna 304. A baseband processor 306 may be coupled to the transceiver 302. The baseband processor 306 may be implemented with a software based architecture, or any other type of architecture. A microprocessor may be used as a platform to run software programs that, among other things, provide executive control and overall system management functions that allow the terminal to operate either as a master or member terminal in a piconet. A digital signal processor (DSP) may be implemented with an embedded communications software layer which runs application specific algorithms to reduce the processing demands on the microprocessor. The DSP may be used to provide various signal processing functions such as pilot signal acquisition, time synchronization, frequency tracking, spread-spectrum processing, modulation and demodulation functions, and forward error correction.

The terminal may also include various user interfaces 308 coupled to the baseband processor 306. The user interfaces may include a keypad, mouse, touch screen, display, ringer, vibrator, audio speaker, microphone, camera and/or the like.

Figure 4:
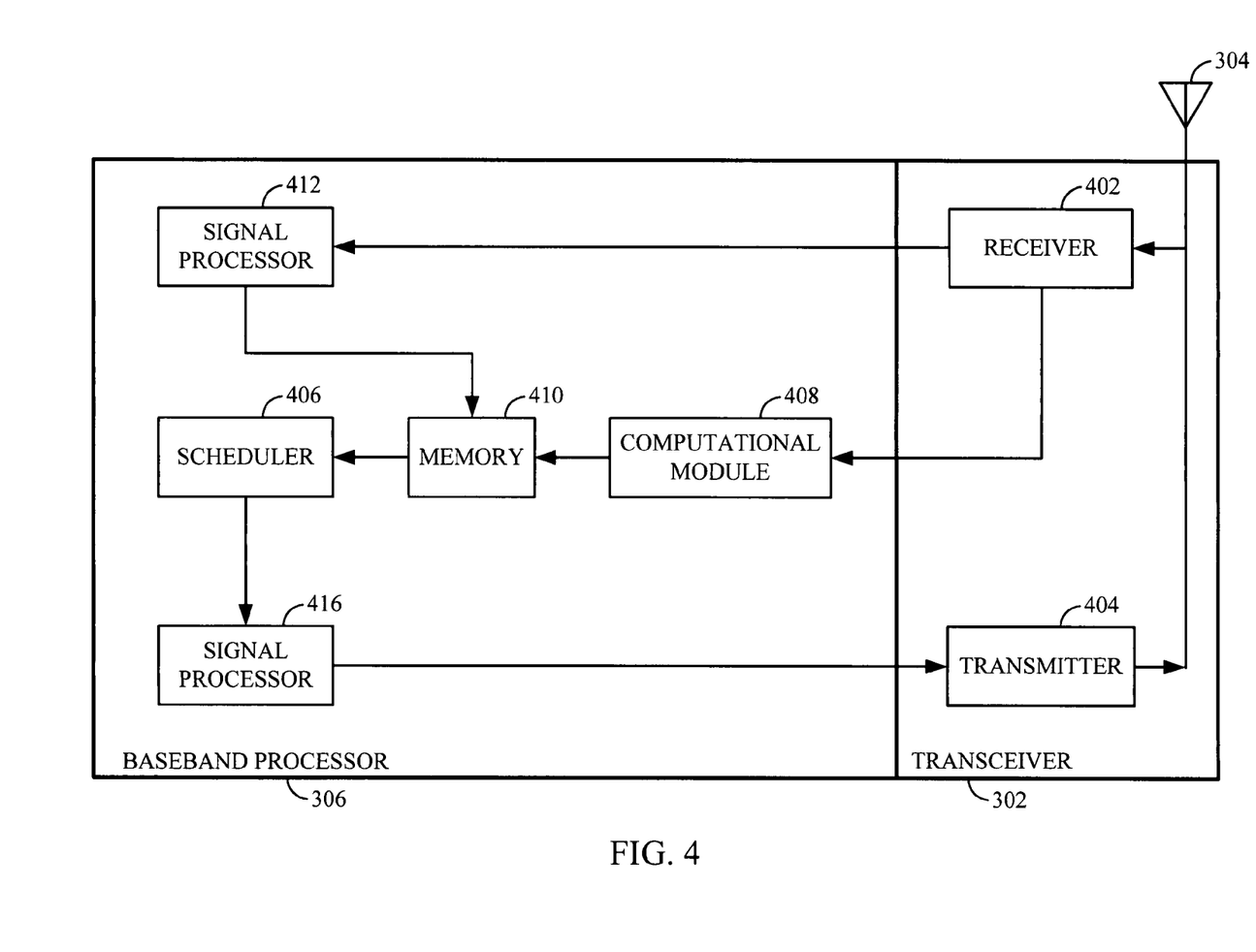
FIG. 4 is a functional block diagram illustrating an example of a baseband processor operating as a master terminal of a piconet.

FIG. 4 is a conceptual block diagram illustrating an example of a baseband processor operating as a master terminal. The baseband processor 306 is shown with the transceiver 302. The transceiver 302 may include a receiver 402. The receiver 402 provides detection of desired signals in the presence of noise and interference. The receiver 402 may be used to extract the desired signals and amplify them to a level where information contained in the received signal can be processed by the baseband processor 306.

The transceiver 302 may also include a transmitter 404. The transmitter 404 may be used to modulate information from the baseband processor 306 onto a carrier frequency. The modulated carrier may be upconverted to an RF frequency and amplified to a sufficient power level for radiation into free space through the antenna 304.

The baseband processor 306 may enable a scheduler 406 when operating as a master terminal. In the software based implementation of the baseband processor 306, the scheduler 406 may be a software program running on the microprocessor. However, as those skilled in the art will readily appreciate, the scheduler 406 is not limited to this embodiment, and may be implemented by any means known in the art, including any hardware configuration, software configuration, or combination thereof, which is capable of performing the various functions described herein.

The scheduler 406 may be used to schedule intra-piconet communications in a way that optimizes the capacity of the piconet. This may be achieved in a variety of ways. By way of example, the scheduler 406 may be used to carefully select the terminal pairs that will engage in simultaneous communications. A transmission power level may be scheduled for each of the simultaneous communications that satisfies a target quality parameter for each of the receiving terminals. The target quality parameter may be the carrier-to-interference (C/I) ratio at the receiving terminal, or any other quality parameter known in the art.

Figure 5:
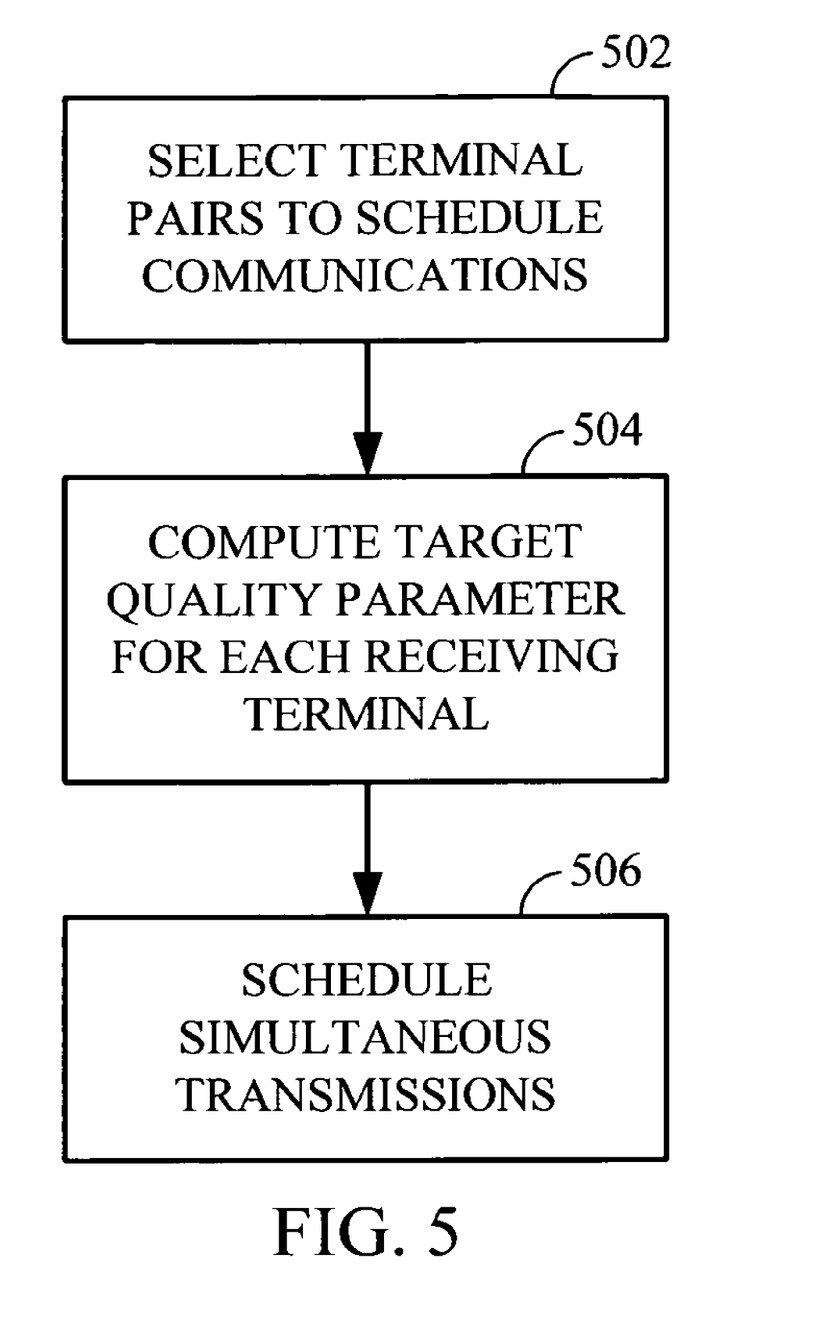
FIG. 5 is a flow diagram illustrating an example the operation of a scheduler in a baseband processor.

FIG. 5 is a flow diagram illustrating an example of the operation of the scheduler. In step 502, the scheduler may begin the process of determining the schedule for the next MAC frame. Initially, the scheduler may determine the amount of data remaining to be transmitted between each terminal pair engaged in communications at the end of the current MAC frame. The scheduler may also schedule new calls between terminal pairs for the next MAC frame. In most instances, the total amount of data to be transmitted to support the existing calls, as well as the new calls, will far exceed that which can be transmitted in a single MAC frame. In that case, the scheduler may schedule only a fraction of the data for transmission in the next MAC frame. The amount of data that can be transmitted in the next MAC frame will depend on the various data rates that can be supported in conjunction with the quality of the wireless medium. Higher data rates tend to increase the amount of data that may be time-division mulitplexed into the MAC frame. However, higher data rates also tend to require a higher carrier-to-interface (C/I) ratio to meet the minimum QoS requirements, and therefore, limit the number of parallel transmissions that can be made. The scheduler may be configured in a way that draws a balance between these two competing factors to maximize the overall capacity of the piconet.

The scheduler may be used to determine the data rate for each new call. The data rate selected by the scheduler may be based on the type of service requested. By way of example, if a member terminal initiates a call with another member terminal to support a video application, the scheduler may determine that the call requires a high data rate. If another member terminal initiates a voice call to another member terminal, the scheduler may select a lower data rate to support the call. The data rates for existing calls are known, and therefore, do not need to be recalculated.

Scheduling decisions may be made once the data rate for each intra-piconet communication is determined. These scheduling decisions may be based on any number of considerations in accordance with any known scheduling algorithm. By way of example, scheduling decisions may be made based on a priority system, where voice communications are given priority over low latency communications. The scheduling algorithm may also give priority to high data rate transmissions in an effort to maximize throughput. A fairness criteria that considers the amount of data to be transferred between terminal pairs and the delay already experienced by such terminal pairs may also be considered. Other factors may be considered and are within the scope of the present invention. Those skilled in the art will be readily able to adapt existing scheduling algorithms to any particular piconet application.

The scheduler may increase the amount of data that can be transmitted in the next MAC frame by scheduling parallel transmissions. The parallel transmissions should be scheduled to maximize data throughput without causing excessive interference. This may be achieved by using a priority based algorithm to schedule parallel transmissions in multiple time slots while maintaining a target C/I ratio for each receiving terminal. The target C/I ratio is the C/I ratio needed to support the data rate that satisfies the desired QoS. The target C/I ratio for each receiving terminal for a new call may be computed, in step 504, from the maximum frame error rate (FER) by means well known in the art. The target C/I ratios for existing calls are known, and therefore, do not need to be recalculated.

Figure 6:
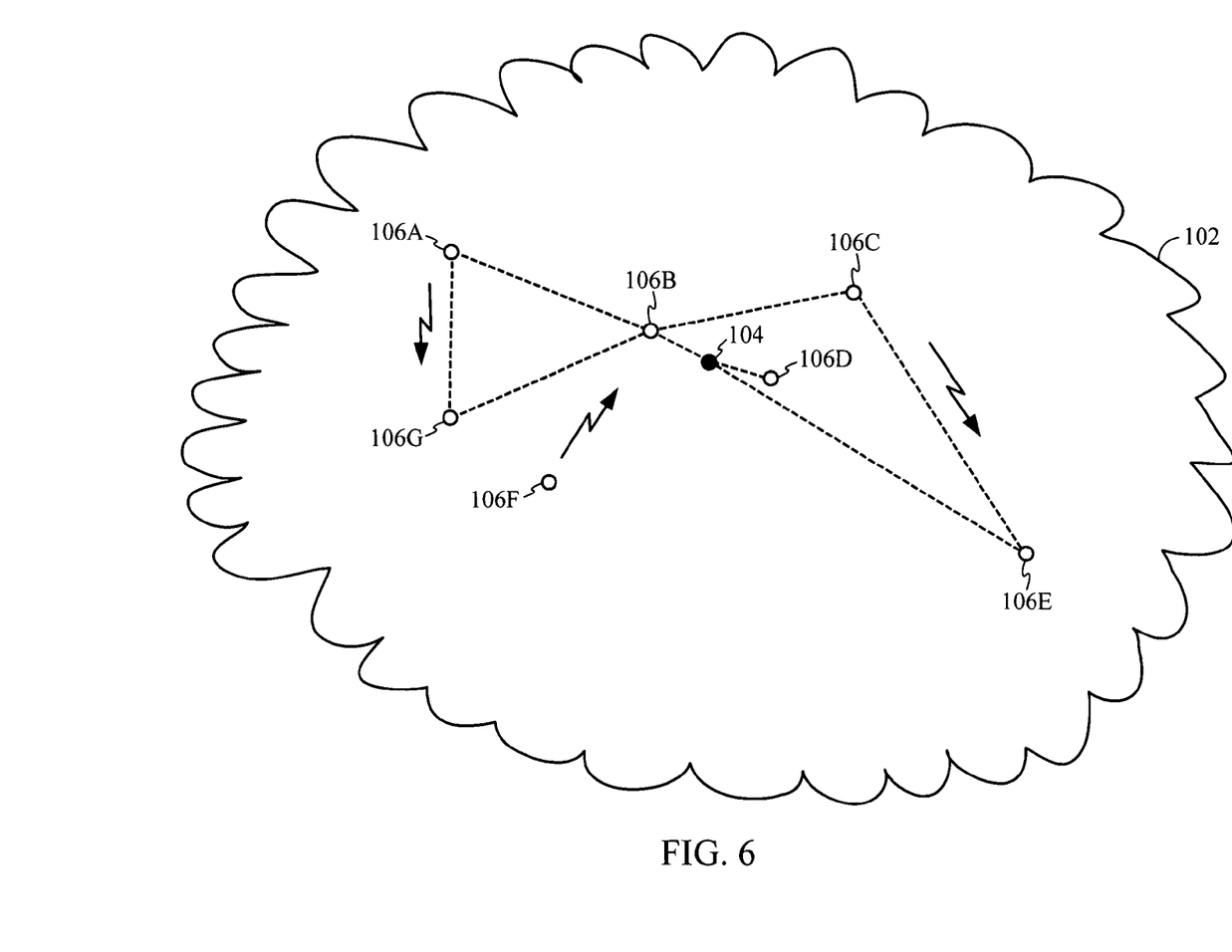
FIG. 6 is a conceptual block diagram illustrating an example of a piconet topology map.

In step 506, the scheduler may be used to schedule simultaneous communications in a way that satisfies the target C/I ratio at each of the receiving terminals for a given MAC frame. A piconet topology map may be used for this purpose. An example of a piconet topology map is shown in FIG. 6. The piconet topology map may be constructed by the master terminal from transmissions it receives from the member terminals. Returning to FIG. 4, a computational module 408 may be used to measure the received signal strength of the member terminals. Since the timing and power level of each member terminal transmission is determined by the scheduler 406, this information may be provided to the computational module 408, and together with the measured received signal strength, the scheduler 406 may be able to compute the path loss to each member terminal.

The member terminals may also be used to periodically provide the master terminal with path loss measurements to other member terminals in the piconet. These measurements may be based on scheduled transmissions between the member terminals. The path loss measurements may be transmitted to the master terminal on one or more of the control channels. A signal processor 412 on the receiving end may employ spread-spectrum techniques to extract these measurements from the control channels and store them in memory 410.

Returning to FIG. 6, a series of broken lines between two terminals represents a known distance between two terminals. The distance on the map may be derived from the path loss measurements made at the master terminal, as well as those reported back to it by the member terminals. However, as will be explained in greater detail shortly, it is the measured path loss and not the distance that is used for parallel transmission scheduling decisions. Therefore, if the master terminal has path loss information for every possible combination of terminal pairs in the piconet, then parallel transmissions may be scheduled without having to know the angular coordinates of each member terminal with respect to the master terminal. As a practical matter, however, a piconet topology map with angular coordinates may prove quite useful in scheduling parallel transmissions. Referring to FIG. 6, a missing series of broken lines between two terminals means that the master terminal does not have path loss information between the two terminals.

A piconet topology map with angular coordinates may be constructed using any number of techniques including, by way of example, the Navstar Global Positioning (GPS) satellite navigation system. In this embodiment, each terminal may be equipped with a GPS receiver which is able to compute its coordinates by means well known in the art. The coordinates for the member terminals may be transmitted to the master terminal over the appropriate spread-spectrum control channel. Returning to FIG. 4, the signal processor 412 in the master terminal may employ spread-spectrum processing to extract the member terminal coordinates and provide them to the scheduler 406. The scheduler 406 may use these coordinates, together with its own coordinates, to construct a piconet topology map such as the one shown in FIG. 6.

The scheduler 406 may use the piconet topology map to estimate the path loss between terminal pairs for which path loss information is not otherwise available. The path loss is a function of the distance between the terminals and the environmental conditions. Since the path loss between a number of terminals is known, and the distance between the same terminals is also known, the effect of the environmental conditions on signal propagation can be estimated by the scheduler 406. If we assume that the environmental conditions are relatively the same throughout the piconet, the scheduler 406 may be able to compute the path loss between terminals for which no path loss information is otherwise available. The results of the path loss computations may be stored in memory 410 for later use. In short range applications, such as UWB, accurate path loss estimates may be made by assuming that the environmental conditions are substantially the same throughout the piconet.

Once the piconet topology map is constructed by the scheduler 406 and the path loss information stored in memory 410, the scheduling decisions may be made. The scheduler 406 may use the information contained in the piconet topology map in conjunction with any other appropriate factors bearing on the scheduling decisions to ensure that the intra-piconet communications scheduled for the following MAC frame do not unduly interfere with one another.

Before describing a methodology for maintaining the target C/I ratio at each receiving terminal in a parallel transmission environment, it is illustrative to examine the impact of parallel transmissions in connection with FIG. 6. Assuming moderate target C/I requirements throughout the piconet, a transmission from the member terminal 106a to the member terminal 106g can probably be scheduled concurrently with a transmission from the member terminal 106c to the member terminal 106e. This scheduling decision should meet the target C/I requirements because the transmission from the member terminal 106a should not cause excessive interference at the member terminal 106e, and the transmission from the member terminal 106c should not cause excessive interference at the member terminal 106g.

A more aggressive scheduling decision might also include a transmission from the member terminal 106f to the member terminal 106b. If the target C/I requirements are low enough, this scheduling decision may not result in excessive mutual interference. However, if the target C/I ratio at the member terminal 106g is high because of, for example, a high data rate application, then the signal power transmitted from the member terminal 106a may also be high, resulting in excessive interference at the member terminal 106b. The interference from the member terminal 106a experienced by the member terminal 106b may reduce the actual C/I ratio below the target, thereby degrading performance to an unacceptable level. In this case, the transmission from the member terminal 106f to the member terminal 106b should be scheduled at a different time.

The scheduling algorithm may include a computation to ensure that the target C/I ratio for each receiving terminal is maintained. The manner in which the scheduler performs this computation may vary depending on the specific application, designer preference and overall design constraints. One example will be provided below for a single time slot in the MAC frame with three simultaneous transmissions.

Turning back to FIG. 6, the three simultaneous transmissions include a transmission from the member terminal 106a to the member terminal 106g, a transmission from the member terminal 106c to the member terminal 106e, and finally, a transmission from the member terminal 106f to the member terminal 106b. The C/I ratio (C/$I_G$) at the member terminal 106g can be computed by the scheduler at the master terminal as follows.

The signal strength at the member terminal 106g is equal to the transmission power ($P_A$) at the member terminal 106a less the path loss ($L_{A-G}$) from the member terminal 106a to the member terminal 106g. The interference at the member terminal 106g results from the signal transmissions by the member terminals 106c and 106f, and can be represented by the transmission power ($P_C$) at the member terminal 106c less the path loss ($L_{C-G}$) from the member terminal 106c to the member terminal 106g plus the transmission power ($P_F$) at the member terminal 106f less the path loss ($L_{F-G}$) from the member terminal 106f to the member terminal 106g. Based on these relationships, the C/I ratio may be computed in the logarithmic domain by the following equation:

$$C/I_G dB = P_A - L_{A-G} - (P_C - L_{C-G} + P_F - L_{F-G} + M) \quad (1)$$

where M is equal to an interference margin that may be used to account for out-of-piconet interference.

Two similar equations may also be used to compute the C/I ratios at the member terminal receivers 106e and 106b. The C/I ratio (C/$I_E$) at the member terminal 106e may be computed in the logarithmic domain by the following equation:

$$C/I_E dB = P_C - L_{C-E} - (P_A - L_{A-E} + P_F - L_{F-E} + M) \quad (2)$$

where:
- $L_{C-E}$ is the path loss from the member terminal 106c to the member terminal 106e;
- $L_{A-E}$ is the path loss from the member terminal 106a to the member terminal 106e; and
- $L_{F-E}$ is the path loss from the member terminal 106f to the member terminal 106e.

The C/I ratio (C/$I_B$) at the member terminal 106b may be computed in the logarithmic domain by the following equation:

$$C/I_B dB = P_F - L_{F-B} - (P_A - L_{A-B} + P_C - L_{C-B} + M) \quad (3)$$

where:
- $L_{F-B}$ is the path loss from the member terminal 106f to the member terminal 106b;
- $L_{A-B}$ is the path loss from the member terminal 106a to the member terminal 106b; and
- $L_{C-B}$ is the path loss from the member terminal 106c to the member terminal 106b.

Substituting into equations (1)-(3) the target C/I ratios for each of the receiving terminals and the path loss information stored in memory, we are left with three equations and three unknowns ($P_A$, $P_C$, $P_F$,) which may be solved algebraically. Assuming that all three equations can be satisfied, then the simultaneous transmissions from the member terminals 106a, 106e and 106b may be scheduled at the computed power levels. If, on the other hand, no combination of power levels can satisfy all three equations, or if any of the required power levels exceed the maximum transmit power of the terminal, then the scheduler will not schedule the three transmissions simultaneously.

Once the scheduling decisions are made, they may be transmitted to the member terminals in the piconet over one or more control channels in the following MAC frame. A signal processor 416 on the transmitting end may be used to spread the schedule assignments before being provided to the transceiver 302 for broadcast to the various member terminals.

Figure 7:
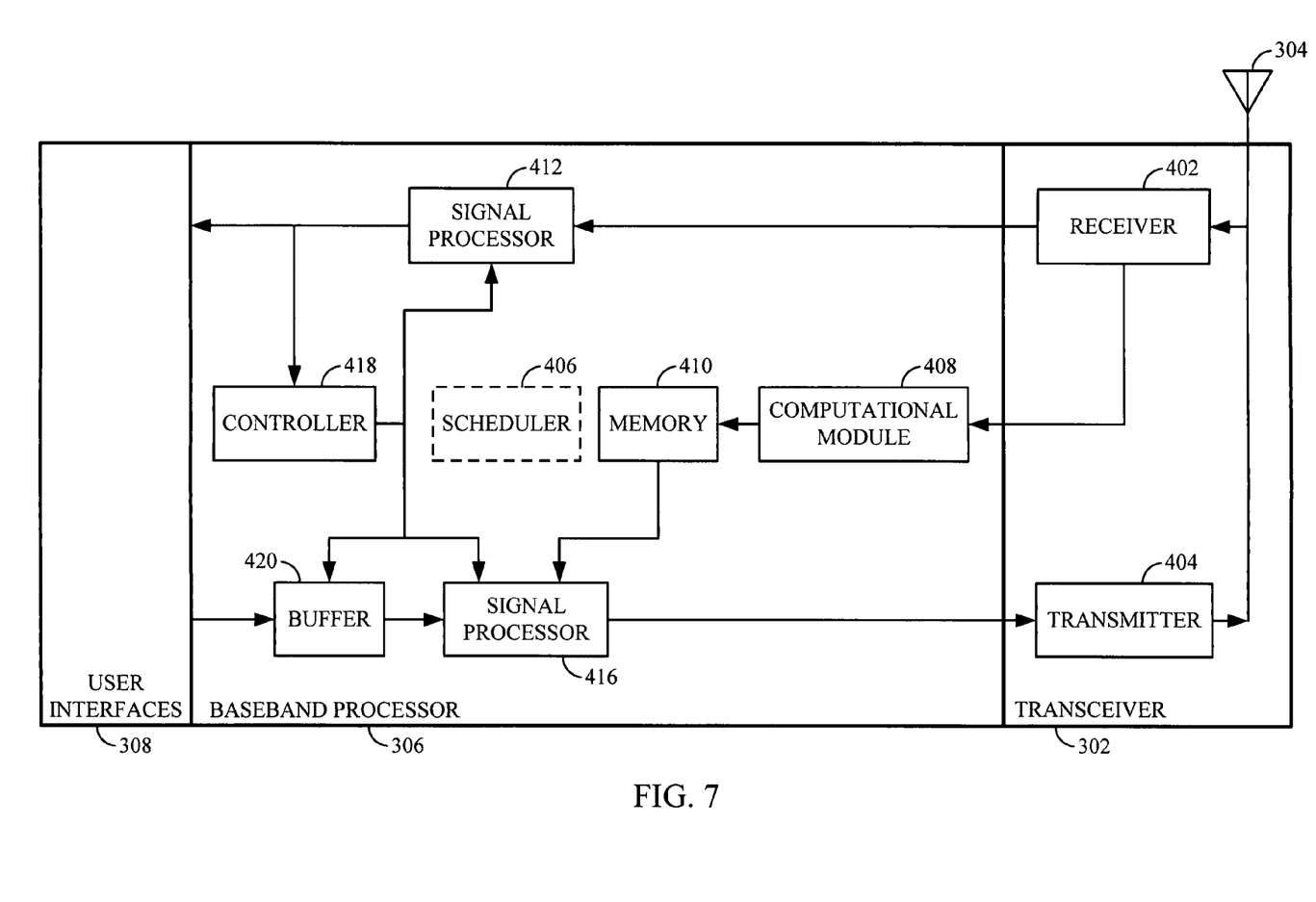
FIG. 7 is a functional block diagram illustrating an example of a baseband processor operating as a member terminal of the piconet.

FIG. 7 is a conceptual block diagram illustrating an example of a terminal with the baseband processor configured as a member terminal. The scheduler 406 is shown with phantom lines illustrating that it is not enabled by the baseband processor 306 during operation as a member terminal. The configuration of the transceiver 302 is the same whether the baseband processor 306 is operating as a master or member terminal, and therefore, will not be discussed further. The transceiver 302 is shown in FIG. 7 for the completeness.

As discussed earlier in connection with the baseband processor 306 configured as a master terminal, the scheduling assignments may be broadcast to all the member terminals in the piconet on one or more control channels. The signal processor 412 on the receiving end may employ spread-spectrum processing to extract the scheduling information from the control channel and provide it to a controller 418. The scheduling information may include the time slot assignments for the various transmissions to and from the member terminal, as well as the power level and data rate for each.

The controller 418 may be used to provide data rate and spreading information to the signal processor 412 on the receiving end for the scheduled transmissions to the member terminal. Using this information, the signal processor 412 may recover communications from other member terminals at the appropriate times and provide the recovered communications to the various user interfaces 308.

The controller 418 may also provide power level information to the computational module 408 for each transmission from another terminal. The computational module 408 may use this information to compute the path loss from the transmitting terminal by using the signal strength measurement from the transceiver 302 during scheduled transmissions. The path loss information computed by the computational module 408 may be stored in memory 410 and provided to the signal processor 416 on the transmitting end during the scheduled time for the control channel broadcast. In various embodiments of the terminal employing a GPS receiver (not shown), it may be used to provide coordinate information to the master terminal over a control channel broadcast via the signal processor 416 and the transceiver 302.

The signal processor 416 may be used to spread communications to various member terminals within the piconet. The communications may be originated from the various user interfaces 308 and stored in a buffer 420 until the scheduled transmission. At the scheduled time, the controller 418 may be used to release the communications from the buffer 420 to the signal processor 416 for spread-spectrum processing. The data rate, spreading code and transmission power level of the communications may be programmed into the signal processor 416 by the controller 418. Alternatively, the transmission power level may be programmed by the controller 418 at the transmitter 404 in the transceiver 302.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in the terminal, or elsewhere. In the alternative, the processor and the storage medium may reside as discrete components in the terminal, or elsewhere.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of scheduling communications, comprising:
    selecting from a piconet of terminals a plurality of terminal pairs each having a transmitting terminal and a corresponding receiving terminal;
    constructing a piconet topology map, the piconet topology map comprising coordinate information concerning the terminal pairs;
    obtaining path loss information for the terminal pairs, the path loss information comprising: available path loss information and estimated path loss information, the estimated path loss information being based upon the piconet map;
    determining a target quality parameter for each of the receiving terminals; and
    scheduling simultaneous signal transmissions from each of the transmitting terminals to its corresponding receiving terminal based upon the path loss information, the scheduling of the simultaneous transmissions including selecting a power level for each of the signal transmissions that satisfies the target quality parameter for each of the receiving terminals.

2. The method of claim 1 further comprising scheduling a different spreading code for each of the signal transmissions.

3. The method of claim 1 wherein the quality parameter comprises a carrier-to-interference ratio.

4. The method of claim 1 further comprising scheduling a data rate for each of the signal transmissions.

5. The method of claim 4 wherein the scheduled data rate for one of the signal transmissions from one of the transmitting terminals is used to determine the target quality parameter at the corresponding receiving terminal.

6. The method of claim 4 wherein the scheduled data rate for the signal transmissions is a function of the type of service requested for each of the terminal pairs.

7. The method of claim 1 further comprising broadcasting the schedule to each of the terminal pairs.

8. The method of claim 7 further comprising spreading the broadcast with a code.

9. The method of claim 1 wherein the path loss information for the terminal pairs comprises path loss information from each of the transmitting terminals to each of the receiving terminals.

10. The method of claim 9 further comprising receiving the path loss information from one or more of the terminals.

11. The method of claim 1, wherein path loss information for the terminal pairs further comprises receiving path loss information from one or more of the piconet terminals.

12. The method of claim 1 further comprising transmitting one of the scheduled signal transmissions to a corresponding one of the receiving terminals.

13. The method of claim 1 further comprising receiving one of the scheduled signal transmissions from a corresponding one of the transmitting terminals.

14. The communications terminal of claim 1 further comprising a transceiver configured to receive the path loss information from one or more of the terminals and memory configured to store the received path loss information, and wherein the scheduler is configured with access to the memory.

15. The communications terminal of claim 1 wherein the scheduler is further configured to schedule the simultaneous transmissions as a function of path loss information from each of the transmitting terminals to each of the receiving terminals.

16. The communications terminal of claim 15 further comprising a transceiver configured to receive the path loss information from one or more of the piconet terminals, and memory configured to store the received path loss information, and wherein the scheduler is configured with access to the memory.

17. A communications terminal, comprising:
a scheduler configured to select a plurality of terminal pairs from a piconet of terminals, the terminal pairs each having a transmitting terminal and a corresponding receiving terminal, to construct a piconet topology map, the piconet topology map comprising coordinate information concerning the terminal pairs, to obtain path loss information for the terminal pairs, the path loss information comprising: available path loss information and estimated path loss information, the estimated path loss information being based upon the piconet map, to determine a target quality parameter for each of the receiving terminals, and schedule simultaneous signal transmissions from each of the transmitting terminals to its corresponding receiving terminal based upon the path loss information, the scheduling of the simultaneous transmissions including selecting a power level for each of the signal transmissions that satisfies the target quality parameter for each of the receiving terminals.

18. The communications terminal of claim 17 wherein the scheduler is further configured to schedule a different spreading code for each of the signal transmissions.

19. The communications terminal of claim 17 wherein the quality parameter comprises a carrier-to-interference ratio.

20. The communications terminal of claim 17 wherein the scheduler is further configured to schedule a data rate for each of the signal transmissions.

21. The communications terminal of claim 20 wherein the scheduled data rate for one of the signal transmissions from one of the transmitting terminals is used to determine the target quality parameter at the corresponding receiving terminal.

22. The communications terminal of claim 20 wherein the scheduled data rate for each of the signal transmissions is a function of the service requested for each of the terminal pairs.

23. The communications terminal of claim 17 further comprising a transceiver configured to broadcasting the schedule to each of the terminal pairs.

24. The communications terminal of claim 23 further comprising a signal processor configured to spread the broadcast with a code.

25. The communications terminal of claim 17 further comprising a transceiver configured to transmit one of the scheduled signal transmissions to a corresponding one of the receiving terminals.

26. The communications terminal of claim 17 further comprising a transceiver configured to receive one of the scheduled signal transmissions from a corresponding one of the transmitting terminals.

27. A communications terminal, comprising:
means for selecting a plurality of terminal pairs from a piconet of terminals, the terminal pairs each having a transmitting terminal and a corresponding receiving terminal;
means for constructing a piconet topology map, the piconet topology map comprising coordinate information concerning the terminal pairs;
means for obtaining path loss information for the terminal pairs, the path loss information comprising: available path loss information and estimated path loss information, the estimated path loss information being based upon the piconet map;
means for determining a target quality parameter for each of the receiving terminals; and
means for scheduling simultaneous signal transmissions from each of the transmitting terminals to its corresponding receiving terminal based upon the path loss information, the scheduling of the simultaneous transmissions including selecting a power level for each of the signal transmissions that satisfies the target quality parameter for each of the receiving terminals.

28. A computer readable-medium encoded with a computer program comprising:
code for causing a computer to select a plurality of terminal pairs from a piconet of terminals, the terminal pairs each having a transmitting terminal and a corresponding receiving terminal;
code for causing a computer to construct a piconet topology map, the piconet topology map comprising coordinate information concerning the terminal pairs;
code for causing a computer to obtain path loss information for the terminal pairs, the path loss information comprising: available path loss information and estimated path loss information, the estimated path loss information being based upon the piconet map;
code for causing a computer to determine a target quality parameter for each of the receiving terminals; and
code for causing a computer to schedule simultaneous signal transmissions from each of the transmitting terminals to its corresponding receiving terminal based upon the path loss information, the scheduling of the simultaneous transmissions including selecting a power level for each of the signal transmissions that satisfies the target quality parameter for each of the receiving terminals.

* * * * *

UNITED STATES PATENT AND TRADEMARK OFFICE
CERTIFICATE OF CORRECTION

PATENT NO. : 7,356,341 B2 Page 1 of 1
APPLICATION NO. : 10/729337
DATED : April 8, 2008
INVENTOR(S) : Sanjiv Nanda It is certified that error appears in the above-identified patent and that said Letters Patent is hereby corrected as shown below:

column 12, line 57, change "claim 1" to --claim 17--.

column 12, line 63, change "claim 1" to --claim 17--.

Signed and Sealed this

Thirteenth Day of July, 2010

David J. Kappos
*Director of the United States Patent and Trademark Office*